United States Patent Office 3,580,947
Patented May 25, 1971

3,580,947
METHOD OF RETARDING POLYMERIZATION IN THE PROCESS FOR THE PRODUCTION OF METHACRYLIC ACID ESTERS
Masashi Ikeda and Masayoshi Inoue, Ohtake-shi, Japan, assignors to Mitsubishi Rayon Co., Ltd., Tokyo, Japan
No Drawing. Filed Oct. 26, 1967, Ser. No. 678,207
Claims priority, application Japan, Oct. 26, 1966, 41/70,254
Int. Cl. C07c 69/54
U.S. Cl. 260—486R
9 Claims

ABSTRACT OF THE DISCLOSURE

A method of retarding polymerization in the process for the production of methacrylic acid esters by the reaction of acetone cyanhydrin or methacrylonitrile with sulfuric acid or fuming sulfuric acid and alcohol, said method being characterized by using as a polymerization-retarder a compound having in its molecular structure an organic ring system represented by

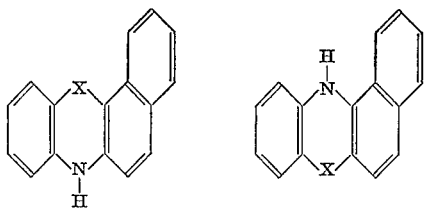

wherein X stands for sulfur, oxygen or nitrogen atom.

The present invention relates to a method of retarding polymerization in the process for the production of methacrylic acid esters by the reaction of acetone cyanhydrin or methacrylonitrile with sulfuric acid or fuming sulfuric acid and alcohol.

DESCRIPTION OF THE PRIOR ART

Methacrylic acid esters are normally produced by a process which comprises the first step of reacting acetone cyanhydrin or methacrylonitrile, as being the starting material, with sulfuric acid or fuming sulfuric acid and the second step of reacting the resultant reaction product with alcohol. In this case, the first step gives methacryl amide or a sulfuric acid derivative which will produce methacryl amide upon hydrolysis, and said methacryl amide or sulfuric acid derivative is treated directly with alcohol and a predetermined amount of water in the second step to be formed into ester. However, methacrylic compounds tend to polymerize so easily that, when methacrylic acid esters are to be produced by the process above described, a large amount of polymers are deposited in an apparatus in which said process is operated. In order to carry out the reaction smoothly, therefore, it is necessary to remove these deposits by cleaning the apparatus. The formation of these deposits is particularly objectionable when synthesis of the esters is carried out on a continuous basis, because they will interfere with the flow of the reaction mixture, hampering the smooth operation, lower the working ratio and reduce the yield.

In an attempt of reducing the amount of undesirable polymers being formed, conventional polymerization-retarders, e.g. hydroquinone type compounds, polyhydroquinone compounds, nitro compounds and inorganic salts, were added to the reaction mixture in the first step or second step, but satisfactory result could not be obtained.

It has been acknowledged that phenothiazine is more effective in retarding the polymerization than the aforesaid polymerization-retarders. However, the use of phenothiazine does not enable the reaction to be carried out continuously satisfactorily for an extended period, because phenothiazine is so easy to sublimate that the sublimated phenothiazine deposits in the discharge opening for the product ester as well as in the conduits for ester vapor during the continuous operation of the reaction for a lengthy period and such deposit plus the polymers being accumulated clog the conduits, thus interfering with the flow of reaction mixture.

In view of the above, the present inventors have conducted a lengthy research with a view to finding a polymerization-retarder which is superior to the conventional ones and suitable for use in a continuous operation of the reaction for a long period, and have arrived at the present invention.

According to the present invention, there is provided a method of retarding polymerization in the process for the production of methacrylic acid esters by the reaction of acetone cyanhydrin or methacrylonitrile with sulfuric acid or fuming sulfuric acid and alcohol, said method being characterized by using as a polymerization-retarder a compound which contains in its molecular structure as organic ring system represented by

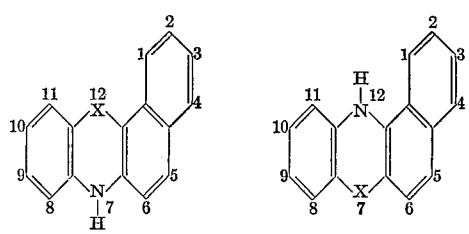

wherein X stands for sulfur, oxygen or nitrogen atom.

The polymerization-retarders usable in the present invention include, e.g. 7-benzophenothiazine, 12-benzophenothiazine, 7-benzophenoxazine, 12-benzophenoxazine, benzophenazine and derivatives thereof such, for example, as substituted derivatives thereof. In general, the most useful substituted derivatives are those which contain a substituent which does not promote the oxidation or polymerization of methacrylic compounds in sulfuric acid medium and particularly those which contain a neutral or reducing substituent such, for example, a chloro group, alkyl group, acetyl group, carboxyl group or phenol group.

Of these compounds, 7-benzophenothiazine and 12-benzophenothiazine are most preferably used, because these benzophenothiazines are easy to produce, can be procured readily at cheap prices and is most excellent in the polymerization retarding activity.

The polymerization-retarders to be used in the present invention are all hard to sublimate and, therefore, are free from the drawbacks of clogging the conduits as has been experienced with phenothiazine.

Moreover, the polymerization-retarders to be used in the present invention, mentioned above, are not necessarily required to be pure but those which are obtained by synthesis can be used as such. For instance, 7-benzophenothiazine can be obtained by reacting N-phenyl-β-naphthylamine with sulfur in the presence of iodine at a temperature of about 210° C. and the 7-benzophenothiazine thus obtained can be used in the present invention without need of refining the same, with sufficiently satisfactory result.

The conventional polymerization-retarders which have effectively been used for the storage or distillation of methacrylic compounds, are rendered substantially ineffective in a reaction system, such as that of the present invention, which is at high temperature and in which sulfuric acid of high concentration is present. In contrast thereto, the polymerization-retarders to be employed in the present invention exhibit an excellent polymerization retarding effect even under such severe conditions.

The polymerization-retarders, according to the present invention, are generally used in an amount of 0.003 to 1.0% by weight, and most preferably 0.01 to 0.2% by weight, of the sulfuric acid or fuming sulfuric acid used, or they are used in an amount of about 0.001 to 0.5% by weight, and preferably 0.005 to 0.25% by weight, of the total weight of the reaction mixture. It is also possible to use the polymerization-retarders in an amount more or less than the amount above specified. An optimum proportion of the polymerization-retarder used is variable depending upon the reaction conditions employed. The most remarkable advantage of the polymerization-retarders according to the present invention is that they can be used in the form of solution in sulfuric acid in the first step of the process, though they may be added in the reactor for the second step in the form of powder, suspension or solution.

The present invention will now be described more specifically by way of example but it should be understood that the present invention is not restricted only to the examples provided herein. In all examples, parts are by weight and the rings are indexed in accordance with the RR1 method described in The Ring Index (L. T. Capell, D. F. Walker; American Chemical Society, Chemical Abstract Service, 1959), vol. 2.

EXAMPLE 1

To 147 parts of 98.5% sulfuric acid having 0.05 part of 7-benzophenothiazine or 12-benzophenothiazine dissolved therein was added 86.3 parts of acetone cyanhydrin with stirring over a period of 20 minutes while maintaining the temperature of the mixture below 70° C. Thereafter, the temperature of the mixture was elevated to 140° C. over a period of about 10 minutes and the mixture was left to stand at that temperature for 10 minutes to form methacrylamide sulfate. The reaction mixture was transferred into a recator for operating the second step of the process, to which 51.2 parts of methanol and 48.6 parts of water were added and refluxed for 4 hours at 80° C., which was followed by steam distillation to obtain a crude methacrylate. The resultant residue remaining in the distillation apparatus contained 0.015 part of polymers in the case of 7-benzophenothiazine and 0.018 part of polymers in the case of 12-benzophenothiazine.

For contrast, methylmethacrylate was synthesized in the same manner as above but without adding 7-benzophenothiazine or 12-benzophenothiazine, and a distillation residue contained 0.84 part of polymers. On the other hand, when methylmethacrylate was synthesized in the same manner as above but using 0.14 part of hydroquinone in lieu of 7-benzophenothiazine or 12-benzophenothiazine, a distillation residue containing 0.72 part of polymers remained in the distillation apparatus. Still further, when 0.05 part of phenothiazine was used, a distillation residue contained 0.04 part of polymers.

EXAMPLE 2

Methyl methacrylate was synthesized in exactly the same manner as in Example 1 except that 147 parts of 98.5% sulfuric acid having 0.05 part of 7-benzophenoxazine or 12-benzophenoxazine dissolved therein, was used in lieu of 147 parts of 98.5% sulfuric acid having 0.05 part of 7-benzophenothiazine or 12-benzophenothiazine dissolved therein. The distillation residue contained 0.025 part of polymers in the case of 7-benzophenoxazine and 0.028 part of polymers in the case of 12-benzophenoxazine.

EXAMPLE 3

Methyl methacrylate was synthesized in exactly the same manner as in Example 1, except that 147 parts of 98.5% sulfuric acid having 0.5 part of benzophenazine dissolved therein, was used in lieu of 147 parts of 98.5% sulfuric acid having 0.5 part of 7-benzophenothiazine or 12-benzophenothiazine dissolved therein. The distillation residue remaining in the distillation apparatus contained 0.02 part of polymers in the case of benzophenazine.

EXAMPLE 4

Methyl methacrylate was synthesized in exactly the same manner as in Example 1, except that 147 parts of 98.5% sulfuric acid having 0.05 part of 6-carboxylic acid 7-benzophenothiazine dissolved therein, was used. The distillation residue remaining in the distillation apparatus contained 0.026 part of polymers.

EXAMPLE 5

Methyl methacrylate was synthesized in exactly the same manner as in Example 1, except that 147 parts of 98.5% sulfuric acid having 0.05 part of 6-carbomethoxy-7-benzophenothiazine dissolved therein, was used. The distillation residue remaining in the distillation apparatus contained 0.022 part of polymers.

EXAMPLE 6

Methyl methacrylate was synthesized in exactly the same manner as in Example 1, except that 147 parts of 98.5% sulfuric acid having 0.05 part of 8-methoxy-9-chloro-7-benzophenothiazine dissolved therein, was used. The distillation residue remaining in the distillation apparatus contained 0.027 part of polymers.

EXAMPLE 7

Methyl methacrylate was synthesized in exactly the same manner as in Example 1, except that 147 parts of 98.5% sulfuric acid having 0.05 part of 8,11-dimethyl-7-benzophenothiazine or 8,11-dimethyl - 12 - benzophenothiazine dissolved therein, was used. The distillation residue remaining in the distillation aparatus contained 0.028 part of polymers in the case of 8,11-dimethyl-7-benzophenothiazine and 0.031 part of polymers in the case of 8,11-dimethyl-12-benzophenothiazine.

EXAMPLE 8

Methyl methacrylate was synthesized in exactly the same manner as in Example 1, except that 147 parts of 98.5% sulfuric acid having 0.05 part of 10-phenyl-7-benzophenothiazine or 10-phenyl-12-benzophenothiazine dissolved therein, was used. The distillation residue remaining in the distillation apparatus contained 0.020 part of polymers in the case of 10-phenyl-7-benzophenothiazine and 0.023 part in the case of 10-phenyl-12-benzophenothiazine.

EXAMPLE 9

Methyl methacrylate was synthesized in exactly the same manner as in Example 1, except that 147 parts of 98.5% sulfuric acid having 0.05 part of 10-tert-amyl-7-benzophenothiazine dissolved therein, was used. The distillation residue remaining in the distillation apparatus contained 0.032 part of polymers.

EXAMPLE 10

Methyl methacrylate was synthesized in exactly the same manner as in Example 1, except that 147 parts of 98.5% sulfuric acid having 0.05 part of 10-methoxy-7-benzophenothiazine dissolved therein, was used. The distillation residue remaining in the distillation apparatus contained 0.017 parts of polymers.

EXAMPLE 11

Methyl methacrylate was synthesized in exactly the same manner as in Example 1, except that 147 parts of 98.5% sulfuric acid having 0.05 part of 7-acetyl-7-benzophenothiazine dissolved therein, was used. The distillation residue remaining in the distillation apparatus contained 0.019 part of polymers.

EXAMPLE 12

Acetone cyanhydrin and 1.5 mols of 98.5% sulfuric acid per 1 mol of acetone cyanhydrin, having 0.02 part of 7-benzophenothiazine or 12-benzophenothiazine dissolved therein, were charged in a mixing tank, maintained at 80° C., at the rate of 11.4 kg./hr. The mixture was passed through a dehydrating tank maintained at 140° C. and then passed through a series of esterifying tanks consisting of a first esterifying tank maintained at 80° to 85° C. and a second esterifying tank maintained at 130° C. under reflux, while adding to said mixture a mixture of methanol and water at the ratio by mol of 1.7 to 4.1, at the rate of 6.8 l./hr., whereby esterification was carried out with an average residence time of the reaction mixture of 5 hours. The methyl methacrylate thus formed was drawn out continuously. Only a trace amount of tar-like polymers was deposited in the esterifying tanks as well as in the conduits, and the operation was performed smoothly for a period of 100 days with no clogging of the connecting conduits and the conduit connected to the discharge opening for ester at all.

For contrast, the same esterification reaction was carried out using phenothiazine. In this case, tar-like polymers began to accumulate in the esterifying tanks as well as in the conduits, from the 15th day after starting the operation, interfering with the flow of the reaction liquid, and sublimated phenothiazine was deposited at the discharge opening for ester as well as in the vapor conduits and closed said conduits on the 21st day, necessitating the interruption of the operation.

EXAMPLE 13

A mixture of sulfuric acid, having 1 mol of methacrylnitrile and 0.02 mol of 7-benzophenothiazine or 12-benzophenothiazine dissolved therein, was sent through an amidizing tank maintained at 98° to 100° C., into an esterifying tank maintained at 80° C., at the rate of 300 ml./hr., wherein esterification reaction was carried out while continuously adding to the mixture a mixture of methanol and water at the ratio by mol of 1.7 to 4. The ester thus formed was led into a drawing tank maintained at 130° C. from which the product ester was drawn out continuously. An extremely small amount of tar-like polymers was deposited in the esterifying tank and in the connecting conduits, and the operation was carried out smoothly for a period of 5 weeks. After the operation, the apparatus used was still in a condition in which further operation is possible.

On the contrary, when phenothiazine was used as a polymerization-retarder, a large amount of tar-like polymers was deposited in the esterifying tank as well as in the connecting conduits, closing said conduits, while sublimated phenothiazine was deposited in the ester discharge opening as well as in the vapor conduit, closing said conduit, thus necessitating the interruption of the operation.

We claim:

1. A method of retarding polymerization in the process for the production of methacrylic acid esters by the reaction of a compound selected from the group consisting of acetone cyanhydrin and methacrylonitrile with a compound selected from the group consisting of sulfuric acid and fuming sulfuric acid, and an alcohol, said method being characterized by using as a polymerization-retarder a compound containing in its molecular structure an organic ring system represented by one of the following formulas:

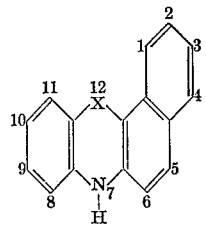 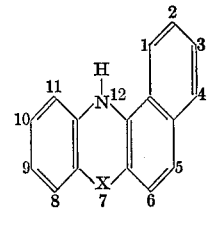

wherein X stands for an atom selected from the group consisting of sulfur, oxygen and nitrogen atoms.

2. A method according to claim 1, in which the polymerization-retarder is at least a compound selected from the group consisting of 7-benzophenothiazine, 12-benzophenothiazine, 7-benzophenoxazine, 12-benzophenoxazine and benzophenazine.

3. A method according to claim 2, in which said polymerization-retarder is a compound selected from 7-benzophenothiazine and 12-benzophenothiazine.

4. A method according to claim 3, in which said compound is used as a polymerization-retarder as obtained by the synthesis without purifying the same.

5. A method according to claim 1, in which said polymerization-retarder is used in an amount of 0.003 to 1.0% by weight of sulfuric acid used.

6. A method according to claim 1, in which said polymerization-retarder is used in an amount of 0.01 to 0.2% by weight of sulfuric acid used.

7. A method according to claim 1, in which said polymerization-retarder is added to the reaction system in the form of solution in a compound selected from sulfuric acid and fuming sulfuric acid.

8. A method according to claim 1, in which said polymerization-retarder is added to the reaction system in the form of a solution or suspension in a water-alcohol solvent.

9. A method of retarding polymerization in the continuous process for the production of methacrylic acid esters by the continuous reaction of a compound selected from the group consisting of acetone cyanhydrin and methacrylonitrile with a compound selected from the group consisting of sulfuric acid and fuming sulfuric acid, and an alcohol, said method being characterized by using as a polymerization-retarder a compound containing in its molecular structure an organic ring system represented by one of the following of the formulas:

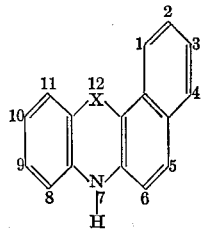 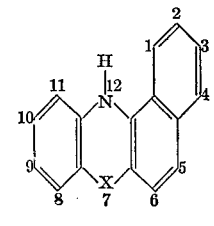

wherein X stands for an atom selected from the group consisting of sulfur, oxygen and nitrogen atoms.

References Cited

UNITED STATES PATENTS

| | | | |
|---|---|---|---|
| 2,618,652 | 11/1952 | Hollyday | 260—486 |
| 2,822,348 | 2/1958 | Haslam | 260—486X |
| 2,891,990 | 6/1959 | Mulvany | 260—486 |

LEWIS GOTTS, Primary Examiner

P. J. KILLOS, Assistant Examiner

U.S. Cl. X.R.

260—243 AE, 244 R, 267, 561 N